March 19, 1929. R. H. SIMONDS 1,706,083
SPECTACLE TEMPLE AND METHOD OF MAKING SAME
Filed Aug. 22, 1923
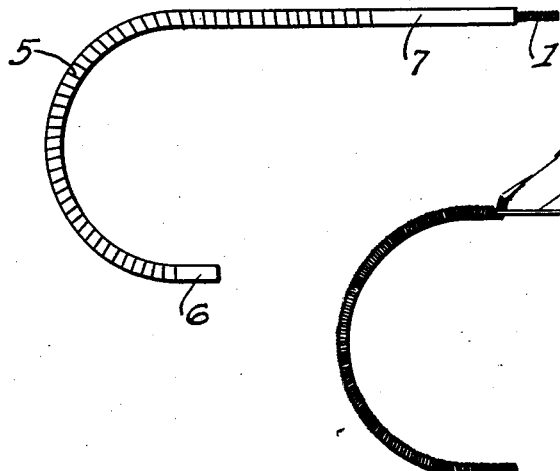
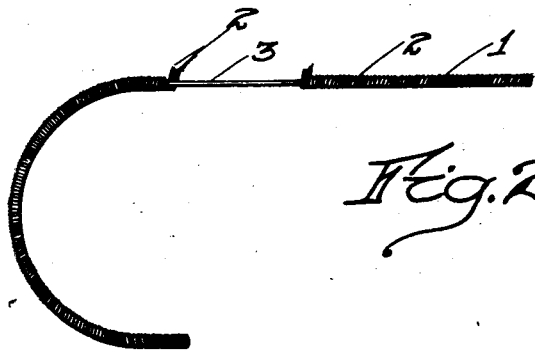
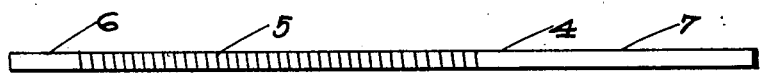
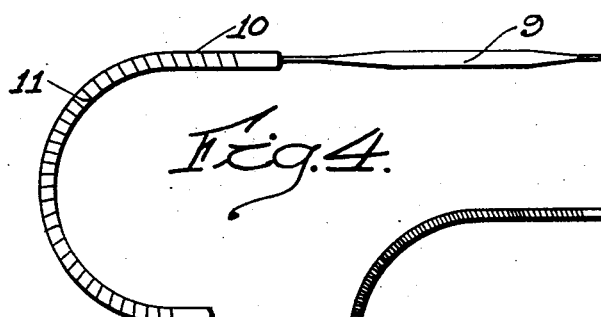
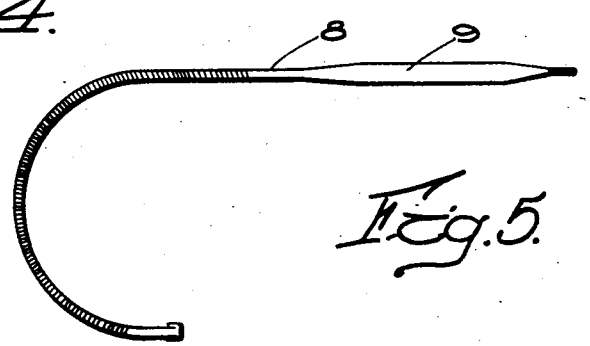
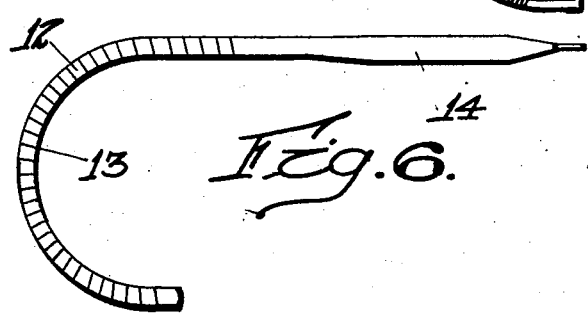
Inventor:
Royal H. Simonds
By Owen W. Kennedy
Attorney Patented Mar. 19, 1929.

1,706,083

UNITED STATES PATENT OFFICE.

ROYAL H. SIMONDS, OF SOUTHBRIDGE, MASSACHUSETTS, ASSIGNOR, BY MESNE ASSIGNMENTS, TO BAUSCH & LOMB OPTICAL COMPANY, OF ROCHESTER, NEW YORK, A CORPORATION OF NEW YORK.

SPECTACLE TEMPLE AND METHOD OF MAKING SAME.

Application filed August 22, 1923. Serial No. 658,753.

My invention relates to spectacle temples, and has for its object to provide an improved spectacle temple that will ride easily on the ears of the wearer without irritating, in any way, the skin behind the ears. My invention further contemplates an improved method of making spectacle temples, the practice of which results in an extremely durable temple which will not show deterioration when subjected to hard usage.

I am aware that spectable temples have been heretofore constructed in such a manner as to afford considerable flexibility and ease of wearing, as compared with ordinary plain wire temples, the usual way of accomplishing this result being obtained by winding a number of layers of pliable wires in spiral form around the temple wire. It has also been proposed to cover the temple wire with non-metallic material having a smooth finish, thereby providing a temple of increased diameter, so as to have a relatively broad bearing around the ears of the wearer. I have found that while the wound wire temples possess considerable flexibility, the separate strands of wire are liable to irritate the ears of the wearer whereas temples formed by covering the wire with a non-metallic material, do not possess sufficient flexibility, although presenting a relatively broad and smooth bearing surface to the ears of the wearer.

According to a feature of the present invention, I propose to provide an improved temple and a method of making same, which results in a temple having both the flexibility and durability of a wound wire temple, and the smooth wearing qualities of a non-metallic temple.

The above and other advantageous features of my invention will hereinafter more fully appear, reference being had to the accompanying drawings in which, Fig. 1 is a view in side elevation of a complete temple constructed in accordance with my invention.

Fig. 2 is a view in side elevation of the wire core embodied in the temple shown in Fig. 1.

Fig. 3 is a view showing a length of non-metallic tubing prior to its application to the temple core shown in Fig. 2.

Fig. 4 is a view similar to Fig. 1, showing a modified form of a completed temple.

Fig. 5 is a view similar to Fig. 2, showing the wire core embodied in the temple of Fig 4.

Fig. 6 is a view similar to Fig. 1, showing a further modification in the form of a completed temple.

Like reference characters refer to like parts in the different figures.

Referring to Fig. 2, the temple core 1 is preferably in the form of a number of flexible wires 2 spirally wound on a wire 3, the wires 2 being soldered, or otherwise secured, to the wire 3 at its ends, so as to form substantially a one piece core. The core thus produced is extremely flexible and durable and presents a relatively rough corrugated surface, as compared to a plain wire core. While I have shown the temple core 1 as being composed of spirally wound wire, my invention also contemplates the employment of a plain wire core having its surface scored, or otherwise roughened, to present substantially the same appearance as the core shown in Fig. 2.

In carrying out my invention I employ a tube 4 of flexible non-metallic material having a smooth finish, such as zylonite, bakelite, or other similar composition readily moldable and of a durable nature, a length of this tubing being shown in Fig. 3. The tube 4 has a continuous cut 5 extending completely through the wall thereof into its hollow center portion, the cut 5 being in helical form. The cut 5 is made over only a portion of the tube 4, leaving uncut portions 6 and 7 at the ends thereof. The core 1 is then inserted into the tube 4, until one end nearly reaches the end of the uncut portion 6. The other end of the core 1 then projects beyond the portion 7 of the tube just enough to permit the attachment of the temple to the spectacle frame or lens. The tube 4 is then compressed along its entire length, with or without the simultaneous application of heat, as desired, the material of the tube 4 being of such a nature that it readily adapts itself to the form of the core 1, with the corrugations of the latter embedded in the inner surface of the tube. The tube 4 is thus permanently attached to the temple core 1 throughout its entire length. If desired, a suitable cement may be applied either to the core 1 or to the tube 4, prior to the pressing operation.

The completed temple then appears as shown in Fig. 1, from which it is apparent that it is then a substantially unitary member, possessing extreme flexibility, owing to the flexible nature of the core 1, and the existence of the helical cut 5 in the tube 4. At the same time, my improved temple presents a non-irritating bearing surface to the ears of the wearer, owing to the smooth nature of the material of which the tube 4 is composed.

A modification of my temple is shown in Figs. 4 and 5, in which the temple core 8 is corrugated for only a portion of its length, the remainder thereof being flattened out, as indicated at 9. A non-metallic, helically cut tube 10, similar in form to the tube 4 extends around the corrugated portion of the wire core 8, terminating at the beginning of the flattened-out portion 9. The tube 10 is provided with a helical cut 11, and is secured to the temple core 8 by being compressed thereon over the corrugated portion in substantially the same manner as the tube 4.

The flattened-out portion 9 of the temple core 8 provides stiffness in a vertical direction where it is desirable, and, at the same time, provides flexibility in a horizontal direction, which flexibility is necessary in relieving the spectacle frame of strain caused by bending the temples horizontally when adjusting the spectacles on the wearer.

A still further modification is shown in Fig. 6, in which the temple core employed is substantially the same as the temple core 8, shown in Fig. 5, whereas the non-metallic tube 12 extends substantially over the whole length of the core. The tube 12 is provided with a helical cut 13 extending over the corrugated portion of the core, and its uncut portion 14 covers the flattened-out portion of the core. The tube 12 is compressed over its entire length to cause the corrugations of the core to be imbedded therein, and to cause it to conform to the flattened-out portion.

From the foregoing it is apparent that by my invention I have provided an improved spectacle temple and a method of making the same, by the practice of which temples are produced having a maximum degree of flexibility and durability, in addition to presenting a smooth, non-metallic bearing surface of relatively large diameter.

I claim:

1. A spectacle temple comprising a tube and a core in the tube, the core comprising one or more wires wound in spiral form, whereby the core is provided with a corrugated surface, the corrugations of the core being embedded in the inner surface of the tube.

2. A spectacle temple comprising a non-metal tube and a core in the tube, the core comprising one or more metal wires wound in spiral form, whereby the core is provided with a corrugated surface, the corrugations of the core being embedded in the inner surface of the non-metal material of the tube.

3. A spectacle temple comprising a non-metal tube and a core in the tube, the core comprising a metal wire and one or more metal wires wound in spiral form around the first-named wire, whereby the core is provided with a corrugated surface, the corrugations of the core being embedded in the inner surface of the non-metal material of the tube.

4. A spectacle temple comprising a non-metal tube and a core in the tube, the core comprising a metal wire and one or more metal wires wound in spiral form around the first-named wire, whereby the core is provided with a corrugated surface, the corrugations of the core being embedded in the inner surface of the non-metal material of the tube, the temple having a shank portion and a body-engaging portion, and the body-engaging portion of the non-metal tube being in the form of a helix.

5. A spectacle temple comprising a non-metal tube and a core in the tube, the core comprising one or more metal wires wound in spiral form, whereby the core is provided with a corrugated surface, the corrugations of the core being embedded in the inner surface of the non-metal material of the tube, the temple having a flattened shank portion and a body-engaging portion, and the body-engaging portion of the non-metal tube being in the form of a helix.

6. A method of making a spectacle temple that comprises inserting in a tube a core comprising one or more wires wound in spiral form whereby the core is provided with a corrugated surface and compressing the material of the tube against the core, whereby the corrugations of the core become embedded in the inner surface of the tube.

7. A method of making a spectacle temple that comprises inserting in a non-metal tube a core comprising a metal wire and one or more metal wires wound in spiral form around the first-named wire, whereby the core is provided with a corrugated surface, and compressing the non-metal material of the tube against the core, whereby the corrugations of the core become embedded in the inner surface of the non-metal material of the tube.

8. An article of manufacture having a core comprising one or more wires wound in spiral form, whereby the core is provided with a corrugated surface, and a member in which the core is disposed, the corrugations of the core being embedded in the member.

9. A spectacle temple having a core comprising a metal wire and one or more metal wires wound in spiral form around the first-named wire, whereby the core is provided with a corrugated surface, and non-metal material in which the core is disposed, the corrugations of the core being embedded in the non-metal material.

10. A method of making an article of manufacture that comprises disposing in a member a core comprising one or more wires wound in spiral form, whereby the core is provided with a corrugated surface, and compressing the member against the core, whereby the corrugations of the core become embedded in the member.

11. A method of making a spectacle temple that comprises disposing in non-metal material a core comprising a metal wire and one or more metal wires wound in spiral form around the first-named wire, whereby the core is provided with a corrugated surface, and compressing the non-metal material against the core, whereby the corrugations of the core become embedded in the non-metal material.

12. A spectacle temple comprising a non-metal member and a core in the non-metal member, the core comprising one or more wires wound in spiral form, whereby the core is provided with a corrugated surface, the corrugations of the core being embedded in the inner surface of the non-metal material of the non-metal member.

13. A spectacle temple comprising a non-metal member and a core in the non-metal member, the core comprising a metal wire and one or more metal wires wound in spiral form around the first-named wire, whereby the core is provided with a corrugated surface, the corrugations of the core being embedded in the inner surface of the non-metal material of the non-metal member, the temple having a shank portion and a body-engaging portion, and the body-engaging portion of the non-metal member being in the form of a helix.

ROYAL H. SIMONDS.